Patented Aug. 20, 1935

2,012,073

UNITED STATES PATENT OFFICE 2,012,073

THIO-SULPHATES AND SULPHONATES OF COMPOUND ETHERS AND A METHOD OF PREPARING THE SAME

Erik Schirm, Dessau (Anhalt), Germany, assignor, by mesne assignments, to "Unichem" Chemikalien Handels A.-G., Zurich, Switzerland, a corporation of Switzerland No Drawing. Application September 15, 1932, Serial No. 633,310. In Germany September 17, 1931

16 Claims. (Cl. 260—99.12)

The present invention relates to salts of α-ether-alkyl-thio-sulphuric acids and to a method of preparing the same. The principal object of the invention is to provide a composition of the type in which alkyl radicals are combined with thio-sulphuric acid radicals which will not form insoluble salts with, for example, calcium and magnesium.

It has been found that one obtains very valuable wetting-out, emulsifying, dispersing, peptizing and cleaning agents if one converts high-molecular halogenated ether of the general formula $$R.O.CHR'.Hal,$$

in which R means an aliphatic, alicyclic or fatty aromatic hydrocarbon residue with at least 8 carbon atoms, whilst R' must be taken to mean a hydrogen atom, or a low alkyl, preferably methyl, with stable salts of the thio-sulphuric acid, preferably alkaline or alkaline-earth thiosulphates, in the presence or absence of inert diluting agents, at the usual or at a moderately increased temperature, if necessary under pressure. During this process salts are formed according to the equation $$R.O.CHR'.Hal + Me_2S_2O_3 = R.O.CHR'.S.SO_3Me + Me-Hal$$

in which Me means one atom of an alkali forming metal, or the ammonium residue or a half-atom of a bivalent alkali forming metal which is preferably an alkaline earth metal—of the alkyl-thio-sulphates etherified in the alpha position, and having the general formula $$R.O.CHR'.S.SO_3H.$$

The halogenated ethers of high-molecular hydrocarbon used in the above reaction as basic material are obtained by the action of dry hydrogen halide on an equi-molecular mixture of a high-molecular alcohol of the aliphatic, alicyclic or fatty aromatic group with a low-molecular aliphatic aldehyde, preferably formaldehyde or acetic aldehyde in monomeric or polymeric form, at a low temperature. During this process it is to be recommended that the work should usually be carried out in the presence of indifferent diluting materials which are free from hydroxyl groups, especially if one wishes to work up fixed alcohols, such as cetyl or octadecyl alcohol at a low temperature according to the process in question, into halogenated alkyl ether.

α-halogenated alkyl ethers have already been prepared from low fatty alcohols or cyclohexanol. But these low-molecular halogenated alkyl ethers are sensitive substances so that, for instance, they can only be distilled off in a non-disintegrated state in the hydrogen current. As against this, the α-halogenated alkyl ethers of the high-molecular aliphatic, alicyclic and fatty aromatic alcohols are stable and they can be distilled without decomposition in a vacuum under the usual technical conditions prevailing.

The new thio-sulphates obtained by the conversion of the halogenated alkyl ethers with salts of thio-sulphuric acid represent a considerable step forward as opposed to products of a similar constitution and of similar characteristics, for example, as opposed to the alkyl sulphonic acids of high-molecular weight, all their salts,—surprising as it may seem,—especially the calcium and magnesium salts, are considerably more easily soluble than the corresponding salts of the simple sulphonic acids. A 0.1% solution of the sodium salt of lauryl sulphonic acid $C_{12}H_{25}SO_3H$ in water of 20 German degrees of hardness (lime hardness) certainly remains clear when being boiled, but when being cooled down a crystalline separation of the hardly soluble calcium salt commences at as early a point as 82° C. The lime stability of this product must therefore be designated as being unsatisfactory, even if, owing to the crystalline property of the precipitation, no smearing of the fibres when this product is used in textile treating-baths (as in the case of ordinary lime-soap septations) is to be feared. The same experiment, carried out with sodium-lauryloxy-methyl-thio-sulphate $$C_{12}H_{25}-O-CH_2-S-SO_3Na$$

results in a commencement of the likewise crystalline calcium salt separation at 55° C. only. This latter product can therefore be designated as being sufficiently lime-stable, for use in practice. The wetting-out, lathering, emulsifying, dispersing, peptizing and washing qualities of the new combination are also excellent. The same applies to the resistance to alkalis and acids which is all the more surprising in the latter case since I am dealing with derivatives of thio-sulphuric acid which is well-known to be highly sensitive to acids. Yet boiling for hours on end with 1% mineral acid causes no disintegration. These products are therefore well suited for use as wetting-out and penetration materials in acid baths, for instance in wool dyeing baths.

*Example 1*

30 parts of trioxymethylene are suspended with 186 parts of lauryl alcohol. While the mixture is stirred and cooled, a stream of dry hydrogen chloride is introduced with the temperature of the mixture at 28–30° C., and is fed in until saturation point is reached. Towards the end of this procedure of the introduction of the stream of hydrogen chloride, it is advisable to cool down to 0–10° C. the lower layer of liquid, consisting of concentrated hydrochloric acid, is then removed and the upper layer which consists principally of laurylchlormethylether, is dried with anhydrous sodium sulphate or calcium chloride, and subjected to fractional distillation in a vacuum. During this process, the chlorated ether flows off as a colorless liquid under 18 mm. Hg-pressure at 162–163° C. The yield amounts to over 80% of the theoretical yield.

200–250 parts of finely powdered, dehydrated sodium thiosulphate are stirred into 235 parts of laurylchlormethylether; during this process the mixture heats up of its own accord to about 50° C. One completes the conversion by heating for some time up to water-bath temperature; any oily by-products which may be present are then removed by extracting them by means of a solvent free oxygen, such as benzine, benzol or chlorated hydrocarbons, and the main product of the reaction is separated from unchanged sodium thiosulphate and sodium chloride by extraction of the mass with absolute alcohol. When the latter has been distilled off, the sodium lauroxymethyl-thio-sulphate remains as a colorless, crystalline powder. After removal of the by-products one can also treat the salt mixture with quite a small quantity of water so that only the inorganic salts go into solution, and the sodium lauroxymethyl-thio-sulphate which remains behind is filtered off, or, if necessary, washed out with cooking salt solution and dried. In order to render the reaction mixture stirrable, the laurylchlormethylether can be mixed with an inert diluting substance of any kind, for instance hydrocarbons of the aliphatic, alicyclic or aromatic group, chlorated hydrocarbons, ketones etc. If diluting substances with a low boiling-point are used, the heating which is afterwards carried out must naturally be done in the autoclave. In order to accelerate the conversion, one can heat up to somewhat higher temperatures, say to 120–150° C., if necessary under pressure.

*Example 2*

In Example 1, the trioxymethylene is replaced by 44 parts of acetic aldehyde or paraldehyde, and carrying out the same working procedure one obtains an equally good yield of lauryl-α-chlorethylether

$C_{12}H_{25}$—O—CH(CH$_3$)Cl boiling under 15 mm. Hg-pressure at 148–153° C.

The further treatment can be carried out exactly as described in Example 1.

*Example 3*

The lauryl alcohol in Example 1 is replaced by a technical mixture of high-molecular, unsaturated fatty alcohols, mostly containing 16 and 18 carbon atoms such as is obtained by decomposition or saponification of sperm-oil (body-oil of the sperm whale (iodine number is about 85)). The mixture of high-molecular unsaturated chlormethylether so obtained can be distilled in a super-vacuum under 3 mm. Hg-pressure and can be isolated from the reaction mixture.

Further working as in Example 1.

*Example 4*

171.5 g. of naphthenalcohol mixture of the boiling point 110–120° C. and with the acetyl saponification number 262.3—such as can be separated from a technical mixture of naphthenalcohols by fractional distillation, the latter mixture having been obtained by the reduction of cleaned technical naphthenic acids as for instance, according to Blanc and Bouveault with sodium and butylalcohol—are stirred up with 100 g. of 40% aqueous formaldehyde solution, and at a temperature of about 10° C. a stream of hydrobromic acid gas is introduced into the mixture until saturation point. The aqueous layer is separated and the naphthenyl-bromethyl-ether is dried with anhydrous calcium chloride. The product is then mixed with about double the quantity of dry benzol and 300 g. of barium thiosulphate which has been dehydrated at temperatures between 100 and 200° C. in a vacuum and ground to the finest powder, is added; the reaction mixture is then heated in autoclaves with stirring device for a few hours up to 120–130° C. The mixture is drawn off by suction when cool, the residue is washed out with benzol, suspended in water and boiled with a slight excess of soda until the barium salts have been completely converted into barium carbonate. Filtration from the barium carbonate is carried out while still hot and the sodium naphthenoxymethylthio-sulphate is crystallized out from the filtrate, if necessary cooking-salt being added.

The Blanc and Bouveault method above mentioned is described in Houben, Die Methoden der organischen Chemie, 1925, vol. II, page 295 and Comptes Rendues, 1903, vol. 136, page 1676 and vol. 137, page 60.

*Example 5*

400 parts by weight of octadecyl alcohol are dissolved under slight heat in 700 parts of benzol and 50 parts of trioxymethylene are added. A lively stream of dry hydrogen chloride is fed in, at first at a temperature of about 33° C. and later at a falling temperature until about 10° C., until saturation is obtained. After the aqueous layer has been separated and the benzolous layer has been dried, the benzol is distilled off from the latter with the help of a weak vacuum, and the crystalline hardening residue is distilled at a pressure of 1–3 mm., during which process the octadecyl-chlor-methylether passes through at 180–190° C. It hardens in the receiver to a white mass of M. P. 27° C. inflating considerably as it does so. Yield: 89% of the theoretical.

Further working can be carried out according to Example 1.

The products obtained according to the preceding examples are in an excellent manner fitted as wetting-out, emulsifying, dispersing, peptizing and cleaning agents. Generally the compounds with 10–12 carbon atoms in the hydrocarbon residue are preferred as wetting-out agents whereas such with more carbon atoms, especially such with 16 and 18 atoms, may be used as emulsifying agents.

In using the obtained products as wetting-out agents, they are dissolved in warm water in proportions from 1:500 to 1:1000 and the textile fabrics to be dyed are treated in the bath. But the thio-sulphates may also be directly added to the dyeing-bath, approximately in a quantity, corresponding to 1–2% of the weight of the goods. In such a case they advance the homogeneous dyeing through of the goods.

To prepare wax-dispersions in water by means of the new thio-sulphates, 1 part by weight of the thio-sulphuric acid compound is fused together with 9 parts by weight of wax. This mixture is mixed by stirring with the desired quantity of water. In this manner may be prepared both a thick paste which, when provided as a salve basis (as a carrier for medicinal substances), may contain 1 part by weight solid composition to 10 parts by weight of water, and a stable aqueous dispersion which, when provided as water-proofing agent for fabrics may be of the proportion 1:100. Besides the waxes also waxlike compounds, as the higher molecular fatty alcohols or their monoglycol-ethers can be easily dispersed in water in a similar manner by the aid of the new thio-sulphates.

The emulsions of fatty oils, mineral oils and other substances not soluble in water, can also be easily prepared by means of the said products. The following is an example for the procedure:

6 parts by weight of sodium lauroxy-methyl-thiosulphate are dissolved in 60 parts by weight of boiling water. This solution is mixed by stirring with 100 parts of tetrahydronaphthaline and this mixture can be diluted to any amount with water, a milk-white, very stable emulsion being obtained.

What I claim is:

1. Process for the production of α-ether-alkyl-thiosulphuric acids and their salts of the general formula:

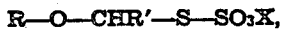
R—O—CHR'—S—SO₃X, in which R means radicals of higher molecular alcohols containing 8 C-atoms or more, R' means hydrogen or low-molecular alkyl-residues and X means hydrogen, alkali metal, alkaline earth or the ammonium radical, comprising the condensation of high molecular alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts.

2. Process for the production of α-ether-alkyl-thiosulphuric acids comprising the condensation of high-molecular aliphatic alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts.

3. Process for the production of α-ether-alkyl-thiosulphuric acids comprising the condensation of high-molecular alicyclic alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts.

4. Process for the production of α-ether-alkyl-thiosulphuric acids comprising the condensation of high-molecular aliphatic aromatic alcohols containing 8 C-atoms or more with low-molecuar aldehydes carried out in known manner with dry hydrogen halide and the conversion of the so obtained α-mono-halogenated ethers with salts of thiosulphuric acid of the group consisting of the ammonium salt, the alkali metal salts and the alkaline earth salts.

5. Process for the production of α-ether-alkyl-thiosulphuric acids and their salts comprising the condensation of high-molecular alcohols containing 8 C-atoms or more with polymerized low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts.

6. Process for the production of α-ether-alkyl-thiosulphuric acids and their salts comprising the condensation of high-molecular alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts in presence of indifferent diluents.

7. Process for the production of α-ether-alkyl-thiosulphuric acids and their salts comprising the condensation of high-molecular alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts at increased temperature.

8. Process for the production of α-ether-alkyl-thiosulphuric acids and their salts comprising the condensation of high-molecular alcohols containing 8 C-atoms or more with low-molecular aldehydes carried out in a known manner with dry hydrogen halide and the conversion of the so obtained α-mono-halogenated ethers with salts of thiosulphuric acid of the group consisting of the ammonium salt, the alkali metal salts and the alkaline earth salts under pressure.

9. The salts of α-ether-alkyl-thio-sulphuric acids of the general formula:

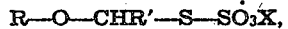
R—O—CHR'—S—SO₃X, in which R means radicals of the high-molecular alcohols containing 8 C-atoms or more, R' means hydrogen or low-molecular alkyl-residues and X means hydrogen or an alkali metal or alkaline earth metal.

10. In the process of producing salts of ether thio-sulphuric acids the step which consists of reacting the halogenated ether containing an alkyl radical having 8 or more carbon atoms in the molecule and an alkyl radical having approximately 1 to 2 carbon atoms in the molecule with a salt of thio-sulphuric acid of the group consisting of the ammonium salt, the alkali metal salts and the alkaline earth metal salts.

11. The salts of α-ether-alkyl-thio-sulphuric acids of the type

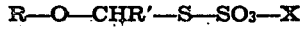
R—O—CHR'—S—SO₃—X in which R represents an alkyl radical of a high molecular alcohol containing approximately 8 to 18 carbon atoms in the molecule, R' represents hydrogen or an alkyl radical containing approximately 1 to 2 carbon atoms in the molecule, and X represents hydrogen, ammonium, alkali metal or an alkaline earth metal.

12. The salts of α-ether-alkyl-thio-sulphuric acids of the type

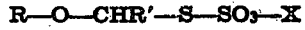
R—O—CHR'—S—SO₃—X in which R represents an alkyl radical of an aliphatic alcohol containing 8 to 18 carbon atoms in the molecule, R' represents hydrogen or an alkyl radical containing approximately 1 to 2 carbon atoms in the molecule, and X represents an alkali metal.

13. The salts of α-ether-alkyl-thio-sulphuric acids of the type $$R-O-CHR'-S-SO_3-X$$

in which R represents an alkyl radical of an alcohol of the group consisting of lauryl alcohol, the unsaturated fatty alcohols containing approximately 16 to 18 carbon atoms in the molecule and naphthenic alcohol, R' represents hydrogen or an alkyl radical containing approximately 1 to 2 carbon atoms in the molecule and X represents an alkali forming metal.

14. The salts of α-ether-alkyl-thio-sulphuric acids of the type $$R-O-CHR'-S-SO_3-X$$

in which R represents the alkyl radical of unsaturated fatty alcohols containing approximately 16 to 18 carbon atoms in the molecule, R' represents hydrogen or an alkyl radical containing approximately 1 to 2 carbon atoms in the molecule, and X represents an alkali metal.

15. The sodium salt of lauryl methyl ether thiosulphuric acid ether.

16. The salts of α-ether-alkyl-thio-sulphuric acids of the type $$R-O-CHR'-S-SO_3-X$$

in which R represents a radical of a fatty aromatic alcohol having 8 or more carbon atoms, R' represents hydrogen or an alkyl radical containing approximately 1 to 2 carbon atoms in the molecule, and X represents hydrogen, ammonium, alkali metal or an alkaline earth metal.

ERIK SCHIRM.